Nov. 5, 1957 H. A. BING ET AL 2,812,420
PHOTOFLASH UNIT
Filed Nov. 10, 1953 5 Sheets-Sheet 1

Herbert A. Bing
James E. Hunter, Jr.
INVENTORS

BY Brown and Mikulka
Attorneys

Nov. 5, 1957 H. A. BING ET AL 2,812,420
PHOTOFLASH UNIT
Filed Nov. 10, 1953 5 Sheets-Sheet 4

Herbert A. Bing
James E. Hunter, Jr.
INVENTORS

BY Brown and Mikulka
Attorneys

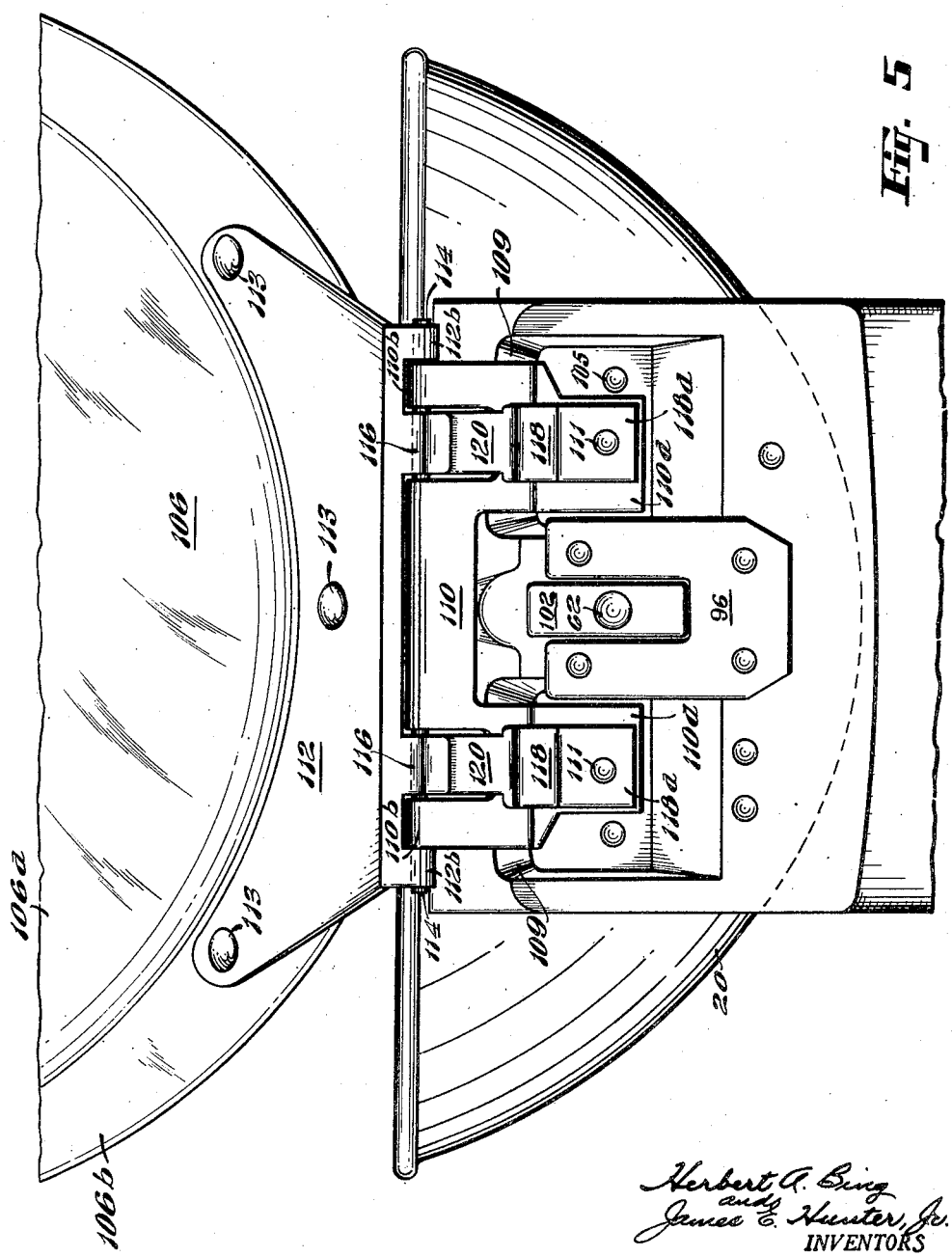

United States Patent Office 2,812,420
Patented Nov. 5, 1957

2,812,420
PHOTOFLASH UNIT

Herbert A. Bing, Wellesley, and James E. Hunter, Jr., Norwood Mass., assignors to Polaroid Corporation, Cambridge, Mass., a corporation of Delaware Application November 10, 1953, Serial No. 391,341

6 Claims. (Cl. 240—1.3)

This invention relates to photo flash units or guns and particularly to a self-contained unit having a source of energy for firing a flash lamp.

An object of the present invention is to provide a novel photo flash unit of the self-contained type having a battery as a source of energy for firing a photo flash lamp and which is adapted to be detachably mounted on a camera and be connected in operative relation to switch means associated with the shutter mechanism of the camera for completing a flash circuit and firing a flash lamp in synchronism with a photographic exposure.

Other objects of the invention are: to provide a photo flash unit comprising, in combination, a casing which is open at the front and adapted to house electrical means for firing a flash lamp, and a concave reflector secured to said casing so as to provide a closure for the front portion of said casing; to provide a photo flash unit having a casing mountable on a camera, a flash bulb receiving socket in said casing, and a reflector secured to said casing in surrounding relation to a photo flash lamp releasably secured in said socket; and to provide a photo flash unit having a minimum of parts and which is compact and inexpensive in construction.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 5 is a bottom plan view of the photo flash unit of Fig. 1 with the shield in open position.

The herein-disclosed photo flash unit is a self-contained unit of the type adapted to be detachably mounted on a camera with built-in flash synchronizing means. The unit preferably includes a battery, condenser and other electrical elements of a battery-capacitance flash circuit which is operatively connected with a synchronizer switch in the camera on which the flash unit is mounted. Generally the flash unit includes a casing open at the front and having a socket in which a flash lamp may be removably secured. A concave reflector is attached to the casing in surrounding relation to the flash lamp and provides a closure for the front of said casing. The rear of the casing generally conforms to the shape of the reflector which closes the front portion of the casing so as to provide for a compact and efficient construction. The bottom portion of the casing is substantially flat and has secured thereto means for mounting the flash unit on a camera and for operatively connecting the battery-capacitance flash circuit of the unit with a flash synchronizer switch in the camera. In addition, there is preferably provided a light-transmitting shield pivotally mounted upon the casing for closing the mouth of the reflector of the unit for controlling the ejection of glass particles from the reflector in the event of an accidental explosion of the flash bulb therein.

Figure 1:
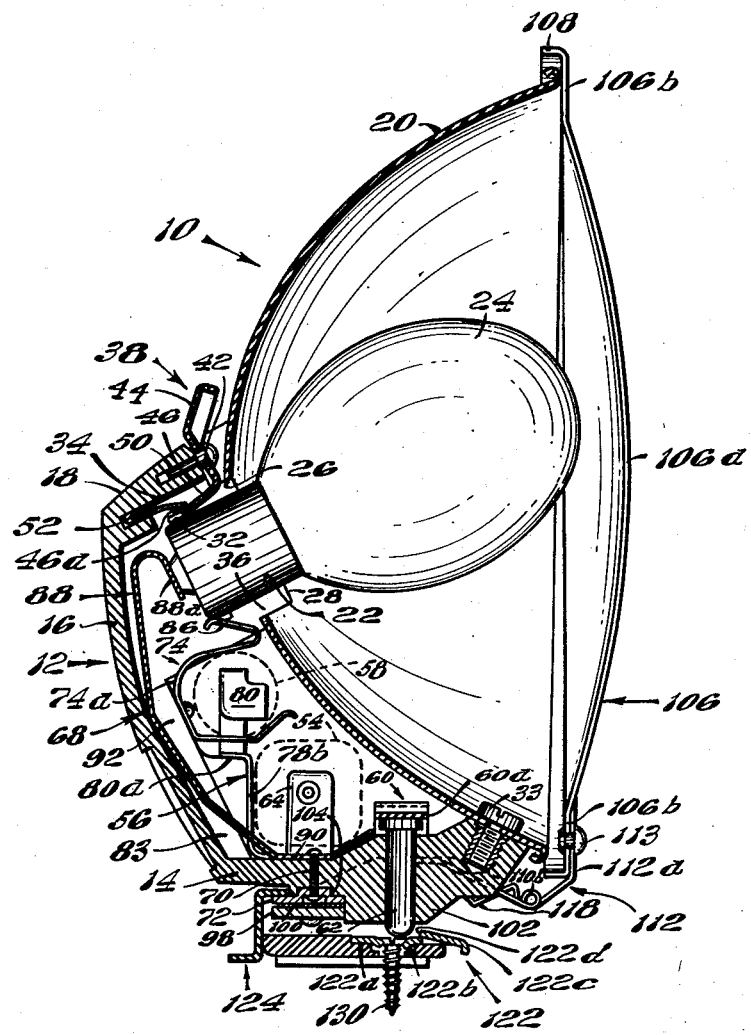
Figure 1 is a sectional view in elevation of a photo flash unit embodying the present invention, the section being taken along a plane substantially through the center of the unit and showing a flash lamp and reflector in place with a condenser and battery indicated in dotted lines.
Figure 2:
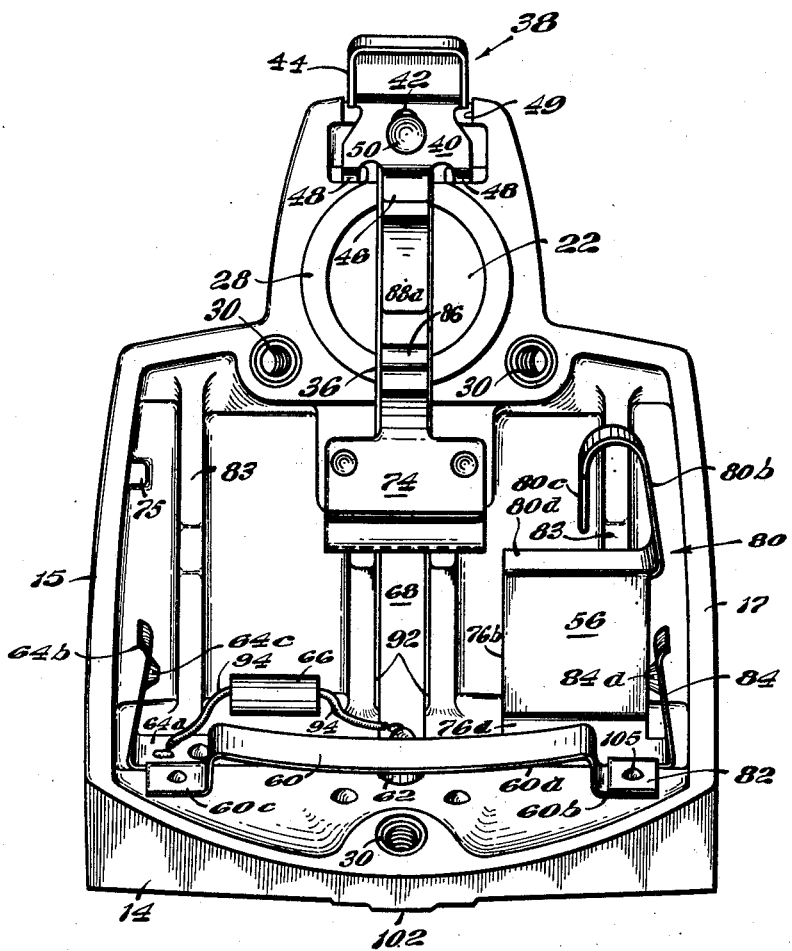
Fig. 2 is a top front view of the photo flash unit of Fig. 1 showing the interior of the photo flash unit as viewed along the axis of the flash lamp socket with the flash lamp, reflector, battery, and condenser removed.

Referring now to the drawings, there is shown in Figs. 1 and 2 a flash unit generally indicated at 10 and comprising a casing or housing 12 having a substantially flat bottom wall 14, two upstanding side walls 15 and 17, a curved rear wall 16 extending angularly upward to the rear, and a relatively short top wall 18 extending angularly upward toward the open front portion of the casing closed by a concave reflector 20. The upper portion of the casing 12 is provided with a cylindrical socket 22 formed therein and extending toward the front and is adapted to receivably engage the bayonet-type base of a conventional photo flash lamp 24. Casing 12 and reflector 20 house and carry the electrical means more fully to be described for firing photo flash lamp 24.

One feature of the invention resides in the use of a casing open at the front and closed by a reflector to house the elements of the flash circuit and thereby providing a construction which is simple, compact and efficient. The rear wall 16 of casing 12 has a rounded contour conforming substantially to the curvature of reflector 20 so that when flash unit 10 is assembled, the rear portion of wall 16 is generally parallel to reflector 20 secured to and forming a closure for the front portion of casing 12. The casing 12, including socket 22, may be formed of any suitable electric nonconducting or insulating material, preferably of the type easily formed or molded, as for example, plastic material such as vulcanized rubber or the material having a cellulose acetate butyrate base, manufactured and supplied by Tennessee Eastman Company under the trade name "Tenite II."

Reflector 20 secured to the casing 12 is shown as an ellipsoidal and having a round opening 26 of slightly greater diameter than socket 22 located adjacent to and below its vertex. The reflector may be made of metal or other suitable material and may have its inner surface suitably polished or reflecting. To position and secure reflector 20 to the open front portion of casing 12, the top 18, bottom 14 and side walls 15 and 17 of the casing are shaped so as to conform to the curvature of the reflector 20 in order that said reflector 20 may be seated snugly thereon, and the casing is provided with a rim 28 surrounding socket 22 and extending outward from the front portion of the casing through opening 26 in reflector 20 when the latter is seated on and secured to the casing. Threaded bushings 30 secured in suitable recesses in the casing are provided adjacent both sides of socket 22 and in bottom wall 14 of the casing so as to engage screws 33 extending through holes in reflector 20, thereby removably securing said reflector to the casing. Screws 33 are preferably of the "coin slotted" type thus providing for easy removal of the reflector 20 and permitting ready access to said casing and the electrical elements housed therein.

The flash lamp 24 in socket 22 and extending through opening 26 in reflector 20 is of the conventional type, having an unthreaded cylindrical base provided with lugs 32 projecting radially outward therefrom at diametrically opposite positions. These lugs 32 are utilized to releasably secure the lamp within the socket 22 in casing 12. An electrical contact is formed and located in the usual manner at the center of the end of the lamp base.

To permit insertion of flash lamp 24 into socket 22, there is provided a channelled groove 34 and a diametrically spaced slot 36 in the wall of the socket 22 adapted to receive lugs 32 on the base of the lamp. The lamp is releasably retained in socket 22 by a latch member 38, the latter (as shown) having a substantially flat base portion 40 with a relatively short slot 42 having rounded ends centrally located therein. An engagement portion 44 extends angularly upward from one end of base portion 40, and a latch portion 46 extends downward from the other end of base portion 40, at substantially 90° thereto. A pair of tabs 48 are also turned down from base 40 at right angles thereto and laterally spaced on both sides of latch portion 46. To pivotally secure latch member 38 to casing 12 in operative position with engagement portion 44 projecting through a suitably formed groove 49 in the top wall 18 of casing 12, there is provided a retaining pin 50 extending through slot 42 in base portion 40 and having a head and a knurled shank which is driven into a suitably formed hole 51 in top portion 18 of the casing. The latch member 38 is made of substantially rigid sheet metal and is positioned so that latch portion 46 normally extends at an angle lengthwise of groove 34 to permit one of lugs 32 on the lamp base to enter said groove. Latch portion 46 is normally biased by a U-shaped spring 52 positioned in groove 34 behind latch portion 46 so that its free end 46a extends into socket 20. As the lamp base is inserted into socket 20, lug 32 coacts with latch portion 46 to deflect the latter against the bias of spring 52 until lug 32 rides over end 46a of portion 46, which then pivots toward the lamp base to retain the flash lamp in the socket. The flash lamp may be released by manually applying pressure to engagement portion 44 to pivot the latter toward the front of the unit, thereby pivoting latch member 38 and moving end 46a of latch portion 46, against the bias of spring 52, out of engagement with lug 32 on the lamp base. The lamp will then be ejected from the socket by spring means, as will be described hereinafter.

Figure 3:
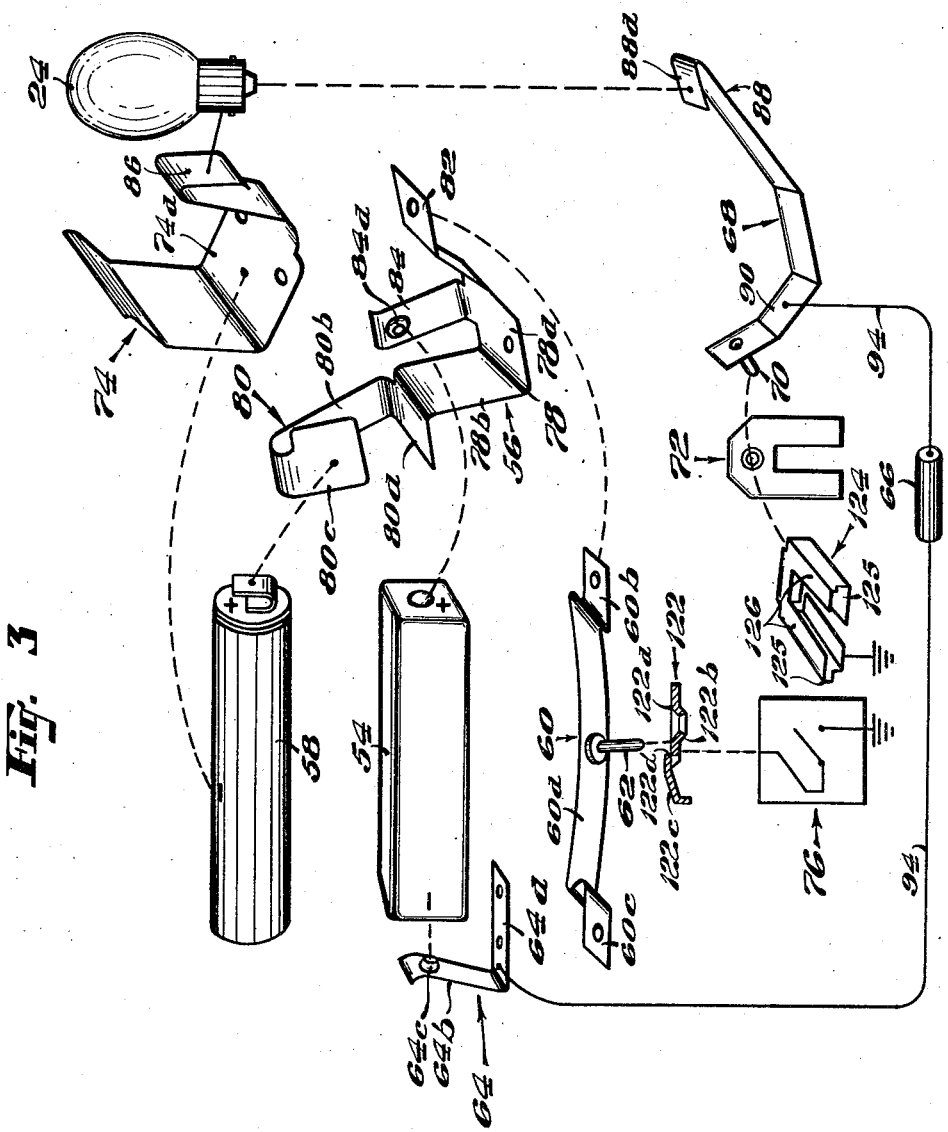
Fig. 3 is a diagrammatic, perspective view of the electrical elements of the photo flash unit arranged schematically to show the electrical circuit.
Figure 4:
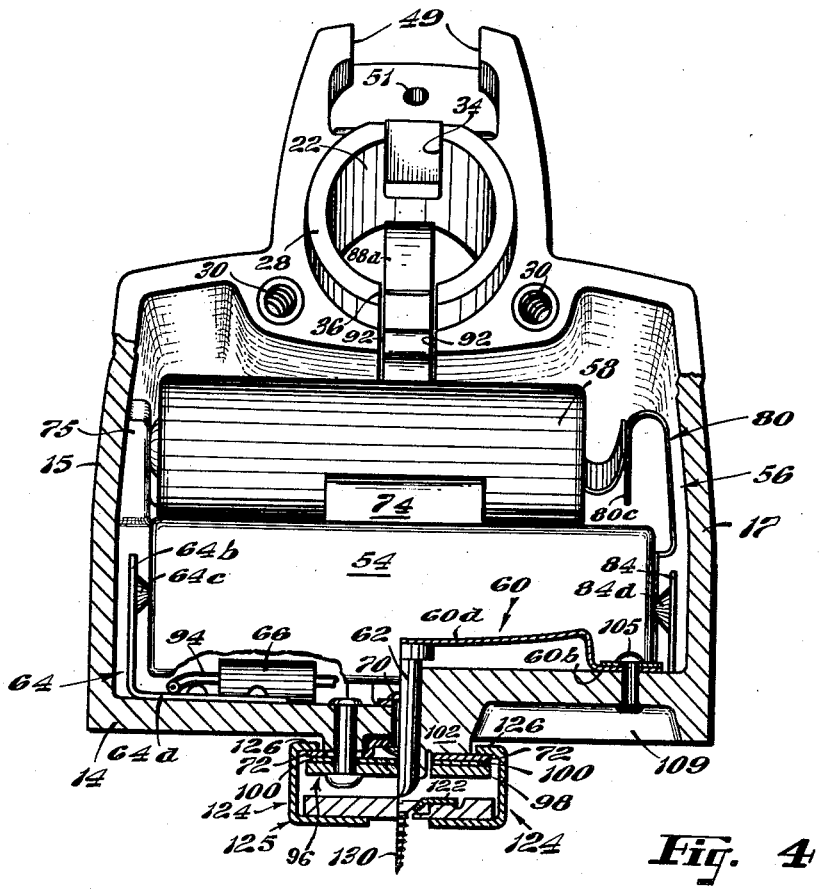
Fig. 4 is a front elevational view, partially in section, of the photo flash unit of Fig. 1 with the flash lamp, reflector and latch member removed, and showing in detail means for mounting the flash unit on a camera.

As previously indicated casing 12, together with reflector 20, house a battery, condenser, and electrical elements comprising a conventional battery capacitance flash lamp circuit. This circuit as illustrated in Fig. 3, comprises a battery 54 the positive terminal of which is connected through a battery-condenser clip 56 to the positive plate of a condenser 58 and through clip 56, a detent spring 60, and a detent plunger 62 to a detent contact on the camera which is connected with a flash synchronizer switch associated with the shutter of the camera. The negative side of the battery is connected by a battery clip 64 through a resistor 66 and an ejector spring 68 to the center terminal of flash lamp 24. The ejector spring 68 is also connected through a rivet 70 to a conductive foot plate 72 which, in turn, is secured in a guide or clip 124 secured to and grounded in the camera housing on which the flash unit 10 is removably mounted. The negative plate of condenser 58 is connected through a condenser clip 74 to the base of the flash lamp. It will thus be noted that battery 54, condenser 58, flash lamp 24 and resistor 66 are connected in a series while the flash lamp synchronizing switch in the camera is connected across the circuit with foot 72 connected between resistor 66 and flash lamp 24, and detent plunger 62 connected between the positive sides of battery 54 and condenser 58.

As may be observed, the circuit shown in Fig. 3 is open until the flash lamp is inserted in socket 22 so as to contact ejector spring 68 and condenser clip 74. The battery 54 then charges the plates of condenser 58. The condenser may then be discharged, firing the flash lamp by closing a synchronizer switch 76 associated with the shutter mechanism of the camera.

Battery 54, the source of electrical energy for the circuit, is preferably of the conventional small 22½ volt type. Battery 54 is mounted in the casing between and retained therein by a battery clip 64 and a battery-condenser clip 56. Battery clip 64 is an L-shaped member formed of substantially rigid sheet metal and having a base leg 64a at which it is secured to the bottom wall 14 of casing 12 adjacent side 15, and an upstanding leg 64b having a raised pierced portion 64c adjacent its end and adapted to contact and frictionally engage the negative terminal of battery 54.

A positive terminal of battery 54 is retained by battery-condenser clip 56 adapted, also, to connect the positive terminal of the battery with the positive plate of condenser 58. Battery-condenser clip 56 is formed, as shown, of a single piece of substantially rigid sheet metal having an L-shaped central section 78, a retrorsely shaped end section 80, and an angular end section 82. Central section 78 comprises a base portion 78a at which clip 56 is secured to bottom wall 14 of casing 12, and an upstanding portion 78b adjacent rear wall 16 of said casing. Base portion 78a is provided with an upstanding arm 84 positioned adjacent side wall 17 and having a raised pierced portion 84a adapted to contact and frictionally engage the positive terminal of battery 54. End section 80 of clip 56 comprises a base portion 80a lying in a plane substantially parallel to base portion 78a and a reversely-bent arm having an upstanding portion 80b, and an enlarged depending end portion 80c adapted to contact the positive terminal of condenser 58. The interior of bottom wall 14 and rear wall 16 of casing 12 are provided with suitable shoulders 83 and are shaped so as to conform to and support central section 78, base portion 80a, and end section 82 of battery-condenser clip 56.

The condenser 58 used in the flash circuit is of the electrolytic type and has, in the circuit illustrated, a capacitance of 100 microfarads. The condenser 58 is mounted in a condenser clip 74, the latter being adapted to contact the lamp base for connecting the flash lamp 24 with the negative plate of the condenser. Condenser clip 74 is formed, as shown, of subtsantially rigid sheet metal, having a generally C-shaped body portion 74a and a depending end portion 86 adapted to extend at an angle lengthwise of slot 36 in the wall of socket 22 so as to contact the base of a flash lamp 24 in said socket. The C-shaped body portion 74a is adapted to fit around condenser 58 so as to retain and support the latter. To prevent end play of the condenser in the casing, side wall 15 is provided with a rib 75 against which one end of the condenser is retained due to the resiliency of end section 80 of battery-condenser clip 58 which bears against the other end of the condenser.

As a means for making a second contact with flash lamp 24 and for ejecting the lamp from socket 22, there is provided an ejector spring 68 formed of a strip of resilient sheet metal. Spring 68 is bent at its central portion so as to conform to the interior of rear wall 16 of casing 12 and has an end portion 90 bent at an angle so as to be substantially parallel to bottom wall 14. The other end section 88 is reversely bent, forming an end portion 88a adapted to contact the center of the flash lamp base. Ejector spring 68 is secured in a channeled recess 92 in rear wall 16 of the casing with end section 88 extending through slot 36 into socket 22. A flash lamp inserted into socket 22 contacts and deforms end portion 88a and the pressure thus exerted on the lamp base by end section 88 is sufficient to eject the lamp from socket 22 when the latter is released by latch member 38 as heretofore described.

Ejector spring 68 and battery clip 64 are connected through a resistance means comprising a conventional carbon resistor 66 having two leads 94 which are affixed preferably by soldering to base leg 64a of battery clip 64 and to the central portion of ejector spring 68. As may be observed, the condenser 58 is connected in series circuit with the battery 54 when a flash lamp is inserted in socket 22. Charging current then flows through the lamp filament, bringing the condenser voltage up to 22½ volts. A 2200 ohm resistor has been found satisfactory for controlling the charging rate of the condenser so that the flash lamp is not fired while at the same time the condenser is charged within approximately five seconds. The use of a flash lamp to close the condenser charging circuit has the advantage of eliminating special switch means for this purpose as it is obvious that the condenser will not be charged and there will be no appreciable drain on the battery when there is a burnt out bulb, or no bulb, in the socket.

Means are provided for mounting the flash unit on a camera and electrically connecting the battery capacitance flash circuit of the unit with a synchronizer switch 76 associated with the shutter of the camera. In the form shown this means comprises a flanged foot generally indicated at 96 and adapted to be engaged by a clip 124 on the camera, and a detent plunger 62 adapted to engage a detent contact 122 on the camera. The foot 96 comprises a pair of U-shaped foot plates 72 and 98 of conductive material with a U-shaped sheet 100 of insulating material therebetween. The foot plates 72 and 98 are secured to a raised portion 102 on the bottom wall 14 of casing 12 and are so former that their edges extend beyond raised portion 102, permitting plate 72 to be engaged by retaining flanges 126 on clip 124 on the camera. Plate 72 is electrically connected with ejector spring 68 by a rivet 70 which extends from portion 90 of spring 68, through a hole in bottom wall 14, and is secured in a recess 104 in foot plate 72.

A second electrical contact is made with the synchronizer switch in the camera by a detent plunger 62 comprising a headed pin having a round end adapted to contact and engage a detent contact 122 on the camera. Plunger 62 extends through a hole formed in the bottom wall 14 and between portions of the U-shaped foot plates 72 and 98. Detent plunger 62 is resiliently retained in this position and electrically connected with battery-condenser clip 56 by a detent spring 60. Detent spring 60 is formed as shown of a resilient sheet metal strip and has an elongated curved central portion 60a adapted to bear against the head of detent plunger 62. The ends of detent spring 60 are formed into L-shaped feet 60b and 60c at which said spring is secured to bottom wall 14 of casing 12. To connect battery-condenser clip 56 with detent spring 60, end portion 82 of said clip and foot 60b of said spring are secured to wall 14 by a rivet 105 so that end portion 82 overlaps and is in contact with foot 60b.

Means are provided for mounting the photo flash unit 10 on a camera and in the form shown comprises a U-shaped guide or clip 124 adapted to engage and retain foot 96, and a detent contact 122 adapted to engage detent plunger 62. Clip 124 includes two generally channel-shaped legs 125 between which foot 96 is inserted and flanges 126 extending inwardly from legs 125 and the base of said U-shaped clip 124. Flanges 126 are adapted to contact and engage front plate 72 and clip 124 is grounded or otherwise electrically connected by suitable means to one terminal of the synchronizer switch 76. Secured to the camera housing between legs 125 and connected to the other terminal of the synchronizer switch is a detent contact 122 adapted to engage detent plunger 62. Detent contact 122 is comprised of a rectangular base portion 122a having therein a circular recessed portion 122b, and a curved ramp portion 122c extending from said base portion 122a. Detent contact 122 may be secured to the camera housing by a screw 130 extending through a hole in the center of recess 122b. When foot 96 is inserted into clip 124 between legs 125, the end of detent plunger 62 rides up and over ramp portion 122c into recess 122b and is retained therein by the pressure of detent spring 60 and a shoulder 122d formed up from ramp portion 122c.

One advantage of the present invention resides in the use of an upper conductive foot plate 72 connected in the flash lamp circuit and a lower foot plate 98 insulated therefrom. This construction of the mounting and retaining foot 96 has eliminated the danger of accidental firing of a flash lamp should the flash unit be placed on an electrically conductive surface. It is obvious that if foot plate 98 formed a part of this circuit and the flash unit were so placed on a metallic surface that both foot plate 98 and detent plunger 92 contacted the surface, the circuit would be completed and the flash lamp fired.

To avoid the danger arising from the accidental explosion of a flash lamp, there is provided a light-transmitting protective shield 106 mounted on casing 12 so that the shield may close the front opening of the reflector during the firing of a flash lamp and may be pivoted away from its closed position to permit access to the interior of the reflector for insertion or removal of a flash lamp.

The protective shield 106 is comprised of a generally spherical body portion 106a of sufficient area to substantially cover the open front end of the reflector 20, and is provided with a generally flat rim 106b and a flanged rim 108. As shown, flanged rim 108 is generally circular and of a diameter slightly greater than the diameter of the open end of reflector 20 so that rim 106b of shield 106 may be held against or seated on the periphery of the open end of the reflector. The protective shield 106 is made, preferably, of any suitable light-transmitting organic plastic material which is relatively non-inflammable, and may also be formed of suitable glass. Preferably the opposed faces of the spherical portion of the shield are concentric so that the shield is substantially without lens power.

Figure 6:
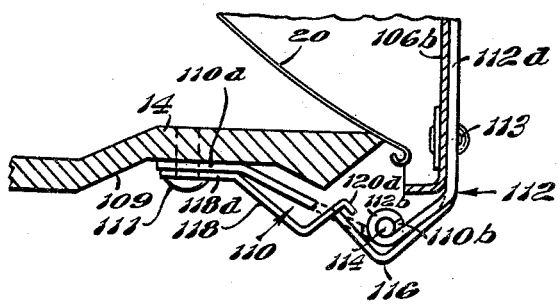
Fig. 6 is a fragmentary sectional view through the bottom of the flash unit showing in detail hinge means mounting the transparent shield and the shield in closed position.

In the illustrated embodiment the shield 106 is shown mounted upon flash unit 10 so that the convex face of the spherical portion thereof extends toward the open end of the reflector 20. As a means for mounting shield 106 upon casing 12 so that it is pivotable about an axis at right angles to the axis of the reflector 20 and in a direction toward and away from reflector 20, there are provided hinge means including a hinge bracket 110 having a pair of angularly bent arms 110a adapted to be affixed in recesses 109 to the bottom wall 14 of casing 12 by suitable fastening means such as rivets 111 or the like. Another hinge member 112 is secured to shield 106 and includes a base portion 112a shaped to conform to flat rim 106b to which it is secured by suitable means such as rivets 113. Hinge bracket 110 and hinge member 112 are provided respectively with overturned hinge tabs 110b and 112b adapted for pivotal mounting on hinge pin 114. To retain the shield at either its opened or closed position hinge member 112 is provided with a pair of detent arms 116 adapted to engage a pair of detent springs 118 secured to bottom wall 14 of casing 12 in recesses 109. Springs 118 include an end portion 118a at which each is secured to wall 14 and an angularly bent spring arm 120 having a turned-down end 120a. Spring 118 is secured to bottom wall 14 so as to extend toward the front of flash unit 10 with arm portion 120 in engagement with detent arm 116 of hinge member 110 when the shield 106 is at its closed position. The pressure of springs 120 on detent arms 116 urge said detent arms downward (in a clockwise direction as viewed in Fig. 6) so as to hold shield 106 in a closed position.

When shield 106 is pivoted to an open position, detent arm 116 is engaged by turned-down tab 120a of detent spring arm 120 defining the limit of the open position. In this position spring arm 120 is deformed so as to be substantially more inclined upward so as to exert a force on the end of detent arm 116 which, at this point, is almost vertically inclined. This force so exerted tends to pivot the hinge member 112 in a clockwise direction (as viewed in Fig. 1) holding shield 106 in its open position.

The foregoing construction and arrangement of elements results in the provision of a self-contained photo flash unit adapted to be detachably mounted on a camera with great facility and which, when mounted on a camera, may be connected with switch means associated with the shutter mechanism of the camera for completing the flash circuit and firing a flash lamp in synchronism with a photoexposure. The photo flash unit is characterized by its efficient, compact construction with a minimum number of parts and attractive appearance made possible by the use of a reflector to close the front of the casing in which the electrical elements of the unit are housed.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photo flash unit for use with a camera and comprising, in combination, a generally cup-shaped casing comprising a plastic molding for mounting and housing electrical elements of a photo flash circuit, said casing being entirely open at the front to provide substantially complete access to the expendable elements of said photo flash circuit, and a cup-shaped reflector removably secured to the front portion of said casing in closing relation thereto, the periphery of said front portion of said casing being so formed as to engage and seat said reflector, the rear of said casing having a generally rounded contour conforming in its rearward portion substantially to the curvature of said reflector, the major portion of said casing being located behind the lower portion of said reflector.

2. A photo flash unit for use with a camera and comprising, in combination, a generally cup-shaped casing comprising a plastic molding for mounting and housing electrical elements of a photo flash circuit, said casing being entirely open at the front to provide substantially complete access to the elements of said photo flash circuit and having peripheral edges extending angularly upward to the rear, a generally ellipsoidal reflector, said edges conforming to the curvature of said reflector and being adapted to seat the latter, and means detachably securing said reflector to said casing in closing relation thereto with the axis of said reflector substantially parallel to the base of said casing, the major portion of said casing being located behind the lower portion of said reflector.

3. A photo flash unit for use with a camera and comprising, in combination, a generally cup-shaped casing comprising a plastic molding for mounting and housing electrical elements of a photo flash circuit, said casing being substantially completely open at the front to provide ready access to the expendable elements of said photo flash circuit and comprising a generally flat bottom wall, a curved rear wall extending angularly upward and a relatively short top portion extending upward toward the open front of said casing, a cup-shaped reflector, and means detachably securing said reflector to the front of said casing in closing relation thereto, the periphery of said casing being so formed to engage and seat said reflector that the rear of said casing conforms substantially to the curvature of said reflector and is in generally parallel relation thereto with the opening of said reflector in a plane substantially perpendicular to the bottom portion of said casing and the major portion of said casing being located behind the lower portion of said reflector.

4. A photo flash unit for use with a camera and comprising, in combination, a generally cup-shaped casing comprising a plastic molding for mounting and housing electrical elements of a photo flash circuit, said casing being substantially entirely open at the front to provide complete access to the elements of said photo flash circuit and having a generally flat bottom wall and a curved rear wall, a cup-shaped reflector, means releasably securing said cup-shaped reflector to the forward periphery of said casing in closing relation thereto, the rear wall of said casing having a generally rounded contour which conforms, when said casing is secured to said reflector, to the curvature of said reflector to provide a closed chamber, the front wall of which is said reflector, for mounting and housing said electrical elements, the distance between said rear wall and said reflector defining the thickness of said chamber, said thickness being substantially less than the length and width of said chamber, the latter extending in a lengthwise direction from substantially the center to substantially the periphery of said reflector with the major portion of said casing being located behind the lower portion of said reflector.

5. A photo flash unit for use with a camera and comprising, in combination, a generally cup-shaped casing comprising a plastic molding open at the front and having a generally flat base wall, a curved rear wall extending angularly upward and a relatively short upper wall extending upward and forward toward the front of said casing, a cup-shaped reflector, means securing said reflector to the front of said casing in closing relation thereto, the forward periphery of the walls comprising said casing being so formed to engage and seat said reflector that the rear of said casing conforms substantially to the curvature of said reflector, and means defining a flash lamp socket in the upper section of said casing, the rear of said casing being in generally parallel relation to the curvature of said reflector, the latter defining, in conjunction with said casing, a space below said flash lamp socket in which electrical elements of a flash lamp circuit are mounted and housed, the major portion of said casing being located behind the lower portion of said reflector and said space within said casing extending from said flash lamp socket to substantially the periphery of said reflector.

6. A photo flash unit for use with a camera and comprising, in combination, a generally cup-shaped casing comprising a plastic molding substantially completely open at the front to provide complete access to the expendable elements of a photo flash circuit and having a generally flat base portion, a curved rear wall and a relatively short upper section, a flash lamp socket in said upper section of said casing opening toward the front of said casing, an ellipsoidal reflector, means securing said ellipsoidal reflector to the front of said casing in closing relation thereto, the periphery of said casing and portions of said upper section surrounding said flash lamp socket being so formed as to snugly engage and seat said reflector, a shoulder on said upper section surrounding said socket, an opening in said reflector adjacent to and below the apex of said reflector adapted to receive said shoulder, the latter cooperating with means securing said reflector to said casing for positioning the reflector with the axis thereof substantially parallel to said base portion with the major portion of said casing located behind the lower portion of said reflector, the rear of said casing conforming substantially to the curvature of said reflector and defining, in conjunction therewith, a space below said flash lamp socket in which elements of a flash lamp circuit are mounted and housed, said space extending substantially to the periphery of said reflector.

(References on following page)

References Cited in the file of this patent

UNITED STATES PATENTS

| | | |
|---|---|---|
| 2,277,233 | Kende et al. | Mar. 24, 1942 |
| 2,443,163 | Harmon | June 8, 1948 |
| 2,496,680 | Schwartz | Feb. 7, 1950 |
| 2,565,492 | French | Aug. 28, 1951 |
| 2,624,831 | Farber | Jan. 6, 1953 |
| 2,638,764 | Schwartz et al. | May 19, 1953 |
| 2,646,672 | Fairbank | July 28, 1953 |
| 2,727,135 | Berg et al. | Dec. 13, 1955 |

FOREIGN PATENTS

| | | |
|---|---|---|
| 696,921 | Great Britain | Sept. 9, 1953 |